US012687284B2

(12) United States Patent
Lv

(10) Patent No.: US 12,687,284 B2
(45) Date of Patent: Jul. 21, 2026

(54) POWER SUPPLY MODULE AND LAMP

(71) Applicants: SUZHOU OPPLE LIGHTING CO., LTD., Suzhou City (CN); OPPLE LIGHTING CO., LTD., Shanghai (CN)

(72) Inventor: Baozheng Lv, Suzhou City (CN)

(73) Assignees: SUZHOU OPPLE LIGHTING CO., LTD., Suzhou City (CN); OPPLE LIGHTING CO., LTD., Shanghai (CN)

(*) Notice: Subject to any disclaimer, the term of this patent is extended or adjusted under 35 U.S.C. 154(b) by 0 days.

(21) Appl. No.: 19/095,003

(22) Filed: Mar. 30, 2025

(65) Prior Publication Data

US 2025/0224106 A1 Jul. 10, 2025

Related U.S. Application Data

(63) Continuation of application No. PCT/CN2023/117630, filed on Sep. 8, 2023.

(51) Int. Cl.
*F21V 23/02* (2006.01)
*F21V 23/04* (2006.01)

(52) U.S. Cl.
CPC ........ *F21V 23/023* (2013.01); *F21V 23/0435* (2013.01)

(58) Field of Classification Search
CPC .... F21V 23/023; F21V 23/0435; F21V 23/02; H01Q 1/22
See application file for complete search history.

(56) References Cited

U.S. PATENT DOCUMENTS

| | | | | |
|---|---|---|---|---|
| 11,156,347 | B2 | 10/2021 | Luo et al. | |
| 2017/0339772 | A1* | 11/2017 | Ozaki | F21V 15/01 |
| 2021/0131654 | A1 | 5/2021 | Luo et al. | |

FOREIGN PATENT DOCUMENTS

| | | |
|---|---|---|
| CN | 201028441 | 2/2008 |
| CN | 108534045 | 9/2018 |
| CN | 111412401 A | 7/2020 |
| CN | 211574843 | 9/2020 |
| CN | 218763227 U | 3/2023 |
| JP | 2017016756 A | 1/2017 |

OTHER PUBLICATIONS

International Search Report issued in PCT Application No. PCT/CN2023/117630 dated Dec. 6, 2023, (6p).

* cited by examiner

*Primary Examiner* — Bao Q Truong
(74) *Attorney, Agent, or Firm* — Arch & Lake LLP; Hao Tan; Shen Wang

(57) ABSTRACT

The present disclosure discloses a power supply module and a lamp. The power supply module includes a mounting seat, a circuit board and an antenna structure. The mounting seat includes a mounting bottom plate, and the circuit board is mounted on the mounting seat. The antenna structure is arranged on the circuit board, and is provided with a first surface opposite to the mounting bottom plate and a second surface facing the mounting bottom plate. The first surface is exposed outside of the mounting seat, and a through hole opposite to the second surface is provided in the mounting bottom plate.

11 Claims, 2 Drawing Sheets

POWER SUPPLY MODULE AND LAMP

CROSS-REFERENCE TO RELATED APPLICATION(S)

This application is based upon and claims the priority of PCT patent application No. PCT/CN2023/117630 filed on Sep. 8, 2023 which claims priority to the Chinese patent application No. 202222623617.1 filed on Sep. 30, 2022, the entire contents of which are hereby incorporated by reference herein for all purposes.

TECHNICAL FIELD

The present disclosure relates to the technical field of lamps, in particular to a power supply module and a lamp.

BACKGROUND

Sometimes lamps are equipped with a power supply module. The power supply module includes a mounting seat, a circuit board and an antenna structure, the antenna structure is mounted on the circuit board, and both the antenna structure and the circuit board are arranged inside the mounting seat.

SUMMARY

The present disclosure provides a power supply module and a lamp.

The present disclosure provides a power supply module which may include a mounting seat, including a mounting bottom plate; a circuit board, the circuit board being mounted on the mounting seat; and an antenna structure, disposed on the circuit board; the antenna structure may have a first surface facing away from the mounting bottom plate and a second surface facing the mounting bottom plate, the first surface may be exposed at an outer side of the mounting seat, and the mounting bottom plate may be provided with a through hole opposite to the second surface.

The present disclosure also provides a lamp. The lamp may include the above power supply module; a housing, the power supply module being mounted inside the housing. The power supply module in the lamp in the present disclosure may adopt the same structure as the above power supply module.

It is to be understood that both the foregoing general description and the following detailed description are exemplary and explanatory only and are not restrictive of the present disclosure.

BRIEF DESCRIPTION OF DRAWINGS

In order to illustrate the technical solutions in the examples of this application more clearly, the accompanying drawings required in the description of the examples are briefly introduced below. Obviously, the accompanying drawings described below are only some examples of the present disclosure. Those skilled in the art can also obtain other drawings according to the drawings without any creative efforts.

DETAILED DESCRIPTION

Figure 1:
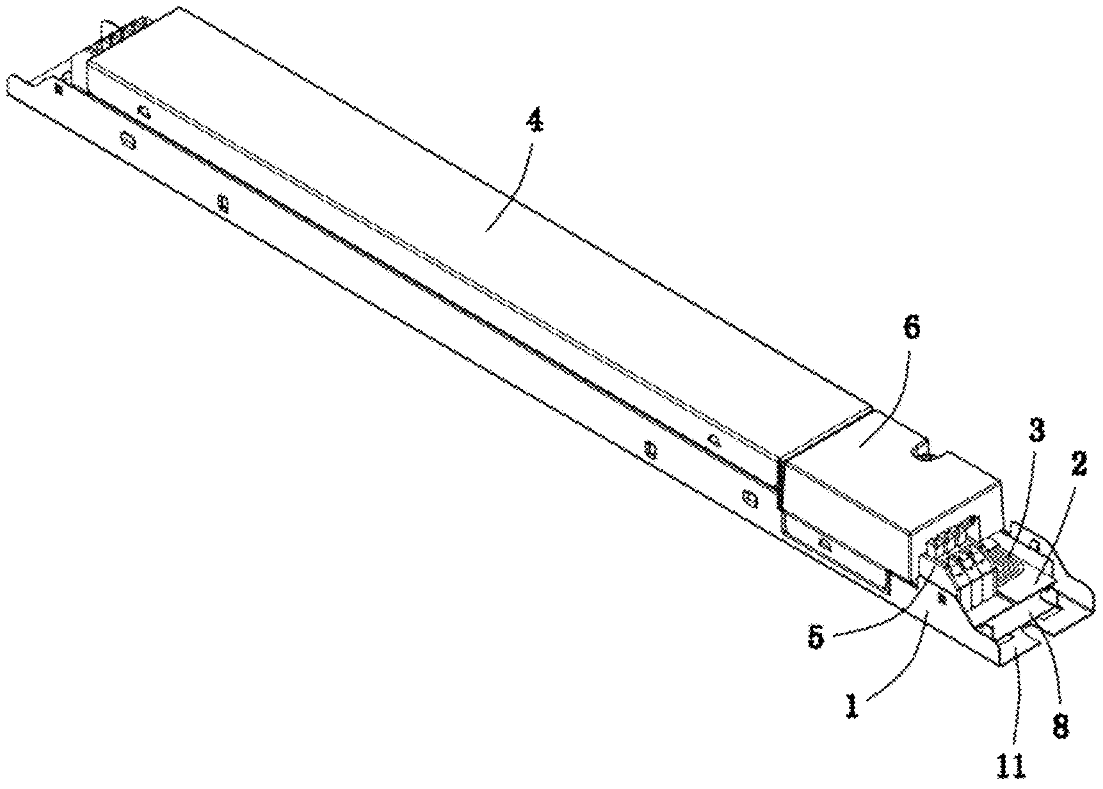
FIG. 1 is a schematic structural diagram of a power supply module in an example of the present disclosure.

The technical solutions in the examples of the present disclosure will be clearly and completely described with reference to the drawings in the examples of the present disclosure. Obviously, the described examples are only a part of the examples of the present disclosure, rather than all the examples. Based on the examples in the present disclosure, all other examples obtained by those skilled in the art without any creative efforts shall fall within the protection scope of the present disclosure.

In the description of the present disclosure, it should be understood that orientations or positional relationships indicated by terms “center”, “upper”, “lower”, “front”, “back”, “left”, “right”, “vertical”, “horizontal”, “top”, “bottom”, “inner”, “outer”, etc., are based on orientations or positional relationships shown in the accompanying drawings, which are merely to facilitate and simplify the description of the present disclosure, but are not to indicate or imply that the referred devices or elements must have a particular orientation, or must be constructed and operated in a particular orientation. Therefore, they should not be construed as limitations to the present disclosure.

The terms “first” and “second” are merely intended for a purpose of description, and cannot be understood as indicating or implying relative importance or implicitly indicating the quantity of indicated technical features. Therefore, features defined with “first” and “second” may explicitly or implicitly include one or more of the features. In the descriptions of the present disclosure, unless otherwise stated, “a plurality of” means two or more than two.

In the description of the present disclosure, it should be noted that unless otherwise specified and defined explicitly, terms “mount”, “link”, “connect” should be construed in a broad sense. For example, it may be fixed connection, detachable connection, or integral connection; it may be mechanical connection; it may be direct connection, indirect connection through an intermediate medium, or internal communication between two elements. For those skilled in the art, specific meanings of the above-mentioned terms in the present disclosure could be understood according to specific circumstances.

The reference numerals in the drawings of the specification of the present disclosure may be explained as follows:

1—Mounting seat; 11—Mounting Bottom Plate; 111—Through Hole; 112—Supporting Portion; 12—First Mounting Side Plate; 121—First Position Limiting Portion; 13—Second Mounting Side Plate; 14—Opposite Connection Portion; 15—Mounting Portion; 2—Circuit Board; 3—Antenna Structure; 4—Cover; 41—First Cover; 42—Second Cover; 421—Avoidance Hole; 43—Cover Connection Portion; 5—Socket Module; 6—Wireless Module; 7—Docking Portion; 8—Insulation Structure; 81—Opening; 9—Connection Piece.

In the case where the antenna structure is entirely located inside the mounting seat, the mounting seat is easy to shield the electromagnetic waves received and emitted by the antenna. Especially when the mounting seat is a metal mounting seat, the mounting seat can shield the signals received and sent by the antenna structure, which leads to the failure of data reading and writing on the surface of the antenna structure facing the mounting seat, and is not conducive to data reading and writing of the antenna structure. Therefore, it is needed to provide a power supply module to solve the above problems.

The present disclosure provides a power supply module and a lamp, which is described in detail below. It should be noted that the order of description in the following examples is not meant to limit the preferred order of the examples of the present disclosure. In the following examples, the description of the various examples have respective different emphases, and a part in some example, which is not described in detail, can be referred to the related description of other examples.

Figure 2:
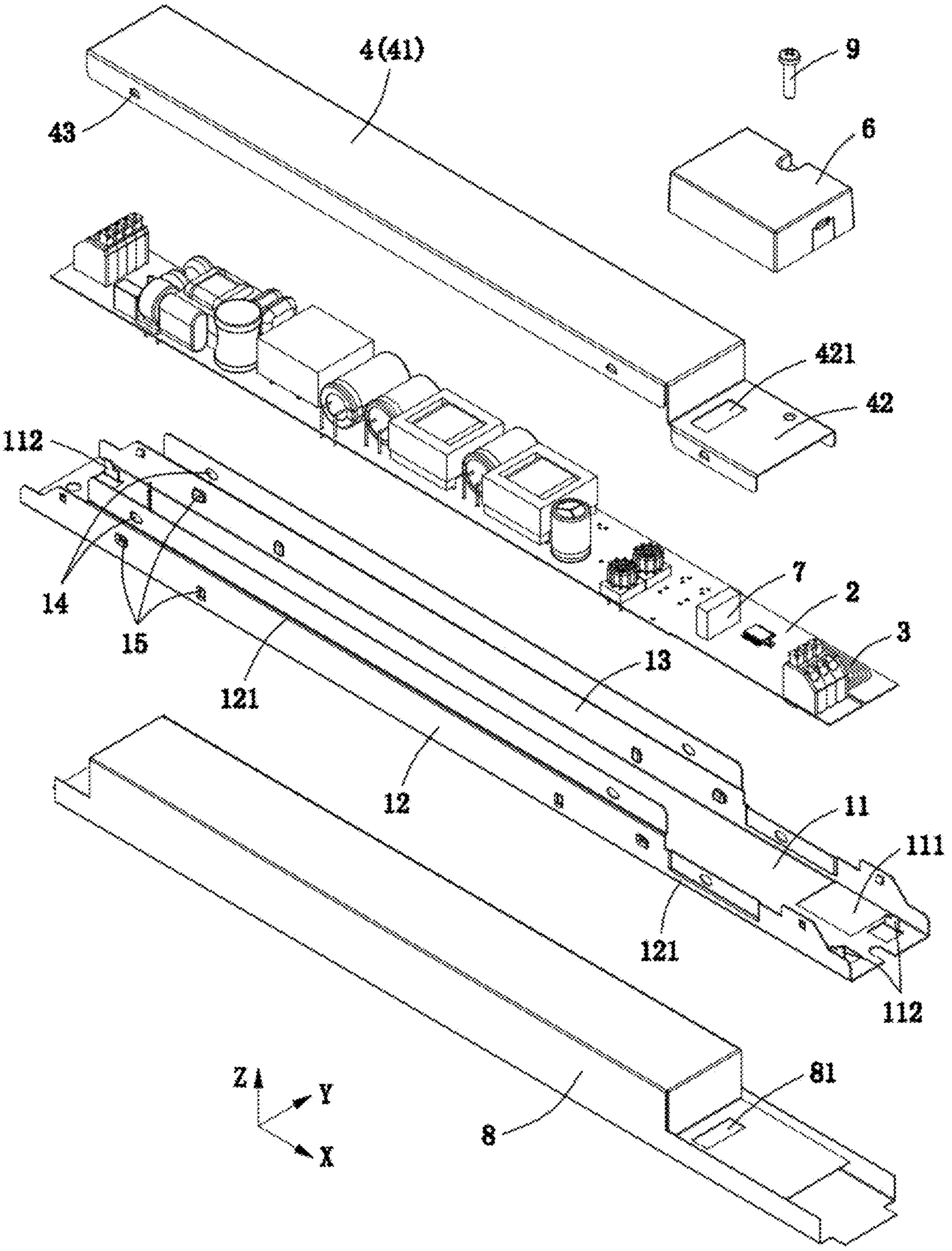
FIG. 2 is an exploded view of the power supply module in the example of the present disclosure.

FIG. 1 is a schematic structural diagram of a power supply module in an example of the present disclosure, and FIG. 2 is an exploded view of the power supply module in the example of the present disclosure. Referring to FIG. 1 and FIG. 2, a lamp usually includes a housing and a power supply module mounted inside the housing, the power supply module includes a mounting seat 1, a circuit board 2 and an antenna structure 3. The circuit board 2 is disposed on the mounting seat 1, and the mounting seat 1 can protect the circuit board 2 and the electronic devices mounted on the circuit board 2. The circuit board 2 is connected with the external power supply through cables, connectors, etc.

The power supply module includes a mounting seat 1, a circuit board 2 and an antenna structure 3. The mounting seat 1 includes a mounting bottom plate 11, the circuit board 2 is mounted on the mounting seat 1, the antenna structure 3 is disposed on the circuit board 2, the antenna structure 3 has a first surface facing away from the mounting bottom plate 11 and a second surface facing the mounting bottom plate 11, the first surface is exposed at the outer side of the mounting seat 1, and the mounting bottom plate 11 is provided with a through hole 111 opposite to the second surface.

Compared with the prior art, the antenna structure 3 in the present disclosure has a first surface (e.g., upper surface) facing away from the mounting bottom plate 11 and a second surface (e.g., lower surface) facing the mounting bottom plate 11. The first surface is exposed at the outer side of the mounting seat 1, the mounting bottom plate 11 is provided with a through hole 111 opposite to the second surface, and the through hole 111 can ensure that there is no obstruction below the antenna structure 3, so the wireless signals of the antenna structure 3 can be read and written normally through the upper and lower parts thereof, thus realizing the double-sided data reading and writing function of the antenna structure 3, and making the data reading and writing of the antenna structure 3 more convenient.

Specifically, in order to improve the heat dissipation effect of the power supply module and reduce the temperature of the power supply module, so as to improve the service life of the power supply module, the mounting seat 1 in the present disclosure is a metal mounting seat. Therefore, when the housing is made of a plastic material, even if the power supply module is mounted inside the housing, data reading and writing can be performed on the antenna structure 3 without disassembling the housing due to the double-sided data reading and writing function of the antenna structure 3 in the power supply module.

Moreover, the antenna structure 3 is integrated on the circuit board 2 through a circuit board printing process and forms an integrated structure with the circuit board 2, so that the mounting step of the antenna structure 3 is omitted in the manufacturing process, and the production efficiency of the power supply module is improved. In addition, the above arrangement can also reduce the size of the power supply module in the second direction Z (height direction, for example, the direction perpendicular to the mounting bottom plate 11 of the mounting seat 1), ensuring that the power supply module has a compact structure in the second direction Z and a small volume. The power supply module further includes a first direction X (length direction) and a third direction Y (width direction), which are perpendicular to each other and parallel to the mounting bottom plate 11 of the mounting seat 1.

Continuing to refer to FIG. 1 and FIG. 2, the circuit board 2 is arranged substantially parallel to the mounting bottom plate 11, a supporting portion 112 is disposed on the mounting bottom plate 11, and the supporting portion 112 extends in the direction pointing to the circuit board 2, so as to support the circuit board 2 and separate the circuit board 2 from the mounting bottom plate 11. That is, the supporting portion 112 is vertically disposed on the mounting bottom plate 11, the height of the supporting portion 112 is equal to the spacing distance between the circuit board 2 and the mounting bottom plate 11. In the present disclosure, on the one hand, the supporting portion 12 is arranged to provide mounting space for electronic devices mounted on the lower surface of the circuit board 2, and on the other hand, the spacing can also form an airflow channel, so that air can flow through below the circuit board 2, and then take away part of the heat generated by the power supply module, which is beneficial to improving the heat dissipation effect of the power supply module.

Illustratively, the supporting portion 112 is configured as a supporting piece disposed on the mounting bottom plate 11, and the supporting piece is bent and extended toward the circuit board 2. In the specific manufacturing process, the mounting bottom plate 11 can be stamped by a stamping process to obtain the above-mentioned supporting piece, so that the manufacturing process of the supporting piece is relatively simple and convenient. That is, the supporting piece and the mounting bottom plate 11 have an integrated structure. Of course, the supporting portion 112 can also be separated from the mounting bottom plate 11, that is, the supporting portion 112 can be mounted on the mounting bottom plate 11 after the production is completed; and therefore, the supporting portion 112 can be replaced according to different spacing requirements between the circuit board 2 and the mounting bottom plate 11.

FIG. 2 of the present disclosure merely shows the schematic structural diagram of the integrated structure of the supporting piece (supporting portion 112) and the mounting bottom plate 11, and four supporting portions 112 are included. Every two supporting portions 112 form a group, and two groups of supporting portions 112 are respectively arranged on the opposite sides of the mounting bottom plate 11 in the first direction X, and the two supporting portions 112 in the same group are arranged at intervals along the third direction Y.

More specifically, the mounting seat 1 includes a first direction X (the first direction X of the mounting seat 1 is the same as the first direction of the power supply module), and the supporting portion 112 has a supporting surface (e.g., the upper surface of the supporting portion 112) close to the circuit board 2, the supporting surface is a stepped surface, and in the first direction X, a step on the stepped surface is configured to position a relative position between the circuit board 2 and the mounting bottom plate 11.

It can be understood that the mounting seat 1 includes a third direction Y perpendicular to the first direction X, and both the first direction X and the third direction Y are parallel to the mounting bottom plate 11. The mounting seat 1 has a substantially U-shaped structure, that is, the mounting seat 1 includes a mounting bottom plate 11 and two mounting side plates (e.g., a first mounting side plate 12 and a second mounting side plate 13) connected to the mounting bottom plate 11, and the two mounting side plates are connected to opposite sides of the mounting bottom plate 11 in the first direction and extend along the first direction. Therefore, the distance between the two mounting side plates (e.g., the first mounting side plate 12 and the second mounting side plate 13) on the mounting seat 1 is ensured to match the size of the circuit board 2 in the third direction Y, so that the positioning between the circuit board 2 and the mounting bottom plate 11 in the third direction Y can be realized.

In some examples of the present disclosure, the power supply module further includes a cover 4, and the cover 4 is mounted on the two mounting side plates of the mounting seat 1. Illustratively, the cover 4 is substantially U-shaped, and the opening of the cover 4 with a U-shaped structure faces the mounting seat 1, and the cover 4 is covered on the mounting seat 1 to form a mounting space, and the mounting space is configured for mounting components, such as the circuit board 2 and the antenna structure 3, etc.

The mounting seat 1 further includes a second direction Z (the second direction Z of the mounting seat 1 is the second direction Z of the power supply module), the second direction Z is perpendicular to the mounting bottom plate 11, at least one of the two mounting side plates is provided with a position limiting portion, and the position limiting portion is configured to define the relative position between the cover 4 and the mounting seat 1 in the second direction, thus ensuring the accuracy of the mounting position between the cover 4 and the mounting seat 1.

Illustratively, a first position limiting portion 121 is formed on the first mounting side plate 12, and a second position limiting portion is formed on the second mounting side plate 13, the outer circumferential surface of the first mounting side plate 12 is a stepped surface, the thickness of the top region thereof is less than the thickness of the bottom region thereof, and the first position limiting portion 121 is configured as a step on the stepped surface. It should be noted that the thickness of the side plate of the cover 4 is equal to the difference between the thickness of the bottom region of the first mounting side plate and the thickness of the top region of the first mounting side plate. Therefore, when the cover 4 is covered on the mounting seat 1, the outer circumferential surface of the cover 4 and the outer circumferential surface of the mounting side plate of the mounting seat 1 can be ensured to be in the same plane, and the structure obtained after mounting of the cover 4 and the mounting side plate of the mounting seat 1 is ensured to be relatively smooth and beautiful. Similarly, the second position limiting portion is also set in this way.

A cover connection portion 43 is provided on the side plate of the cover 4, an opposite connection portion 14 is provided on the mounting side plate of the mounting seat 1, and the cover connection portion 43 is connected to the opposite connection portion 14, so as to realize the fixation between the mounting seat 1 and the cover 4. The cover connection portion 43 and the opposite connection portion 14 are both threaded holes, and they are connected through a fastening screw. Alternatively, one of the cover connection portion 43 and the opposite connection portion 14 is a buckle, and the other of the cover connection portion 43 and the opposite connection portion 14 is a hook, and they are fixed through a snap connection.

In addition, a mounting portion 15 is further provided on the mounting seat 1, through which the power supply module can be mounted as a whole at a target position, for example, inside the housing of a lamp. The mounting portion 15 can be fixedly connected to the housing by means of snap connection, screw connection, bonding, etc.

In some examples of the present disclosure, the power supply module further includes a socket module 5 and a wireless module 6. The socket module 5 is electrically connected with the circuit board 2 and configured to be connected with a load, and the wireless module 6 is electrically connected with the circuit board 2 and configured to receive or send a data signal. For example, the wireless module 6 can realize the function after receiving the control signal, that is, the light source of the lamp is provided with a driving module, and the wireless module is matched with the driving module to adjust the brightness and color of the light source.

Continuing to refer to FIG. 2, the cover 4 includes a first cover 41 and a second cover 42, the first cover 41 is disposed farther away from the circuit board 2 than the second cover 42, the second cover 42 is provided with an avoidance hole 421, the wireless module 6 is connected to a side of the second cover 42 facing away from the circuit board 2, the circuit board 2 is connected to a docking portion 7, and the avoidance hole 421 is configured to allow the docking portion 7 to pass through and allow the docking portion 7 to be electrically connected with the wireless module 6. That is, the top plate of the second cover 42 is closer to the circuit board 2 than the top plate of the first cover 41, and the wireless module 6 is mounted at the outer side of the mounting space enclosed by the mounting seat 1 and the cover 4, which is beneficial for the wireless module 6 to receive or send data signals.

In some examples of the application, the power supply module further includes an insulating structure 8, and the insulating structure 8 is disposed on an inner circumferential side of the mounting seat 1 and the cover 4, and configured to provide an insulated connection between the circuit board 2, the cover 4 and the mounting seat 1, so that the charged body (circuit board 2) are insulated from the cover 4 and the mounting seat, thus preventing the power supply module from electric shock failure during use and ensuring the safety of the power supply module.

It should be noted that the insulating structure 8 includes a first insulating member and a second insulating member, the first insulating member is disposed on the inner circumferential side of the cover 4, the second insulating member is disposed on the inner circumferential side of the mounting seat 1, and the circuit board 2 is surrounded by the first insulating member and the second insulating member. Illustratively, in order to ensure that the docking portion 7 mounted on the circuit board 2 can pass through the second cover 42, the first insulating member is provided with an opening 81 corresponding to the avoidance hole 421 on the second cover 42.

In some examples of the present disclosure, the power supply module further includes a connection piece 9, and the connection piece 9 is configured to detachably and fixedly mount the wireless module 6 on the cover 4 (i.e., the second cover 42). Illustratively, the connection piece 9 is a fastening screw, and the wireless module 6 and the second cover 42 are provided with threaded holes corresponding to the connection piece 9. By connecting the wireless module 6 and the second cover 42 with the fastening screw, the connection between them can be ensured to be more stable and reliable, and it is convenient to disassemble them. Alternatively, the connection piece 9 is a connection buckle and a connection hook, and one of the connection buckle and the connection hook is provided on the wireless module 6, and the other of the connection buckle and the connection hook is provided on the second cover 42.

The present disclosure provides a power supply module and a lamp, aiming at solve the problem that the antenna structure in the power supply module cannot read and write data on the surface facing the mounting seat.

In order to achieve the above object, on the one hand, the present disclosure provides a power supply module, including: a mounting seat, including a mounting bottom plate; a circuit board, the circuit board being mounted on the mounting seat; and an antenna structure, disposed on the circuit board; the antenna structure has a first surface facing away from the mounting bottom plate and a second surface facing the mounting bottom plate, the first surface is exposed at an outer side of the mounting seat, and the mounting bottom plate is provided with a through hole opposite to the second surface.

In some examples of the present disclosure, the antenna structure is integrated on the circuit board through a circuit board printing process and forms an integrated structure with the circuit board.

In some examples of the present disclosure, the circuit board is arranged substantially parallel to the mounting bottom plate, a supporting portion is disposed on the mounting bottom plate, and the supporting portion extends in a direction pointing to the circuit board, so as to support the circuit board and separate the circuit board from the mounting bottom plate.

In some examples of the present disclosure, the supporting portion is configured as a supporting piece disposed on the mounting bottom plate, and the supporting piece is bent and extended toward the circuit board.

In some examples of the present disclosure, the mounting seat includes a first direction, the supporting portion has a supporting surface close to the circuit board, the supporting surface is a stepped surface, and in the first direction, a step on the stepped surface is configured to position a relative position between the circuit board and the mounting bottom plate.

In some examples of the present disclosure, the power supply module further includes: a cover, mounted on two mounting side plates of the mounting seat and encloses a mounting space together with the mounting seat, the mounting seat includes a first direction, and the two mounting side plates are connected to opposite sides of the mounting bottom plate in the first direction and extend along the first direction.

In some examples of the present disclosure, the mounting seat further includes a second direction, the second direction is perpendicular to the mounting bottom plate, at least one of the two mounting side plates is provided with a position limiting portion, and the position limiting portion is configured to define a relative position between the cover and the mounting seat in the second direction.

In some examples of the present disclosure, the power supply module further includes: a socket module, electrically connected with the circuit board, and configured to be connected with a load; a wireless module, electrically connected with the circuit board, and configured to receive or send a data signal.

In some examples of the present disclosure, the cover includes a first cover and a second cover, the first cover is disposed farther away from the circuit board than the second cover, the second cover is provided with an avoidance hole, the wireless module is connected to one side of the second cover facing away from the circuit board, the circuit board is connected to a docking portion, and the avoidance hole is configured to allow the docking portion to pass through and allow the docking portion to be electrically connected with the wireless module.

In some examples of the present disclosure, the power supply module further includes: an insulating structure, disposed on an inner circumferential side of the cover and the mounting seat, and configured to provide an insulated connection between the circuit board, the cover and the mounting seat.

The antenna structure in the present disclosure has a first surface (e.g., upper surface) facing away from the mounting bottom plate and a second surface (e.g., lower surface) facing the mounting bottom plate. The first surface is exposed at the outer side of the mounting seat, the mounting bottom plate is provided with a through hole opposite to the second surface, and the through hole ensures that there is no obstruction below the antenna structure, so the wireless signals of the antenna structure can be read and written normally through the upper and lower parts thereof, thus realizing the double-sided data reading and writing function of the antenna structure, and making the data reading and writing of the antenna structure more convenient.

In a second aspect, the present disclosure provides a lamp, which includes: the above power supply module; a housing, the power supply module being mounted inside the housing. The power supply module in the lamp in the present disclosure adopts the same structure as the above power supply module, so the power supply module in the lamp can achieve the same technical effects as the above power supply module.

It is to be understood that both the foregoing general description and the following detailed description are exemplary and explanatory only and are not restrictive of the present disclosure.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

In the description of this specification, specific features, structures, materials or characteristics can be combined in any one or more examples or examples in a suitable way.

What is described above is only the specific implementations of the present disclosure, but the protection scope of the present disclosure is not limited thereto. Any variation or replacement easily occurred to those skilled in the art within the technical scope disclosed in the present disclosure shall fall within the protection scope of the present disclosure. Therefore, the protection scope of the present disclosure is subject to the protection scope of the claims. In addition, specific examples are used in the specification to explain the principle and implementation of the present disclosure. The description of the above examples is only used to help understand the method and core idea of the present disclosure, and the contents of the specification should not be understood as limitations to the present disclosure.

The invention claimed is:

1. A power supply module, comprising:

a mounting seat, comprising a mounting bottom plate;

a circuit board, the circuit board being mounted on the mounting seat, wherein the circuit board is arranged substantially parallel to the mounting bottom plate, a supporting portion is disposed on the mounting bottom plate, and the supporting portion extends in a direction pointing to the circuit board, so as to support the circuit board and separate the circuit board from the mounting bottom plate; and an antenna structure, disposed on the circuit board, wherein the antenna structure has a first surface facing away from the mounting bottom plate and a second surface facing the mounting bottom plate, the first surface is exposed at an outer side of the mounting seat, and the mounting bottom plate is provided with a through hole opposite to the second surface.

2. The power supply module according to claim 1, wherein the antenna structure is integrated on the circuit board through a circuit board printing process and forms an integrated structure with the circuit board.

3. The power supply module according to claim 1, wherein the supporting portion is configured as a supporting piece disposed on the mounting bottom plate, and the supporting piece is bent and extended toward the circuit board.

4. The power supply module according to claim 1, wherein the mounting seat comprises a first direction X, the supporting portion has a supporting surface close to the circuit board, the supporting surface is a stepped surface, and in the first direction X, and a step on the stepped surface is configured to position a relative position between the circuit board and the mounting bottom plate.

5. The power supply module according to claim 3, wherein the mounting seat comprises a first direction X, the supporting portion has a supporting surface close to the circuit board, the supporting surface is a stepped surface, and in the first direction X, and a step on the stepped surface is configured to position a relative position between the circuit board and the mounting bottom plate.

6. The power supply module according to claim 1, further comprising:

a cover, mounted on two mounting side plates of the mounting seat and encloses a mounting space together with the mounting seat, wherein the mounting seat comprises a first direction X, and the two mounting side plates are connected to two opposite sides of the mounting bottom plate in the first direction X and extend along the first direction X.

7. The power supply module according to claim 6, wherein the mounting seat further comprises a second direction Z, the second direction Z is perpendicular to the mounting bottom plate, at least one of the two mounting side plates is provided with a position limiting portion, and the position limiting portion is configured to define a relative position between the cover and the mounting seat in the second direction.

8. The power supply module according to claim 7, further comprising:

a socket module, electrically connected with the circuit board, and configured to be connected with a load; and a wireless module, electrically connected with the circuit board, and configured to receive or send a data signal.

9. The power supply module according to claim 8, wherein the cover comprises a first cover and a second cover, the first cover is disposed farther away from the circuit board than the second cover, the second cover is provided with an avoidance hole, the wireless module is connected to one side of the second cover facing away from the circuit board, the circuit board is connected to a docking portion, and the avoidance hole is configured to allow the docking portion to pass through and allow the docking portion to be electrically connected with the wireless module.

10. The power supply module according to claim 6, further comprising:

an insulating structure, disposed on an inner circumferential side of the cover and the mounting seat, and configured to provide an insulated connection between the circuit board, the cover and the mounting seat.

11. A lamp, comprising:

a power supply module;

a housing, the power supply module being mounted inside the housing;

wherein the power supply module comprises:

a mounting seat, comprising a mounting bottom plate;

a circuit board, the circuit board being mounted on the mounting seat, wherein the circuit board is arranged substantially parallel to the mounting bottom plate, a supporting portion is disposed on the mounting bottom plate, and the supporting portion extends in a direction pointing to the circuit board, so as to support the circuit board and separate the circuit board from the mounting bottom plate; and an antenna structure, disposed on the circuit board, wherein the antenna structure has a first surface facing away from the mounting bottom plate and a second surface facing the mounting bottom plate, the first surface is exposed at an outer side of the mounting seat, and the mounting bottom plate is provided with a through hole opposite to the second surface.

* * * * *